(12) United States Patent
Zheng

(10) Patent No.: US 9,424,812 B2
(45) Date of Patent: Aug. 23, 2016

(54) METHOD AND ELECTRONIC APPARATUS FOR ACHIEVING TRANSLATION OF A SCREEN DISPLAY INTERFACE

(71) Applicant: HUIZHOU TCL MOBILE COMMUNICATION CO., LTD, Huizhou, Guangdong (CN)

(72) Inventor: Yu Zheng, Guangdong (CN)

(73) Assignee: Huizhou TCL Mobile Communication Co., Ltd., Huizhou (CN)

( * ) Notice: Subject to any disclaimer, the term of this patent is extended or adjusted under 35 U.S.C. 154(b) by 80 days.

(21) Appl. No.: 14/402,228

(22) PCT Filed: Aug. 6, 2013

(86) PCT No.: PCT/CN2013/080864
§ 371 (c)(1),
(2) Date: Nov. 19, 2014

(87) PCT Pub. No.: WO2014/146389
PCT Pub. Date: Sep. 25, 2014

(65) Prior Publication Data
US 2015/0124001 A1    May 7, 2015

(30) Foreign Application Priority Data

Mar. 18, 2013 (CN) .......................... 2013 1 0087300

(51) Int. Cl.
  *G09G 5/00* (2006.01)
  *G09G 5/38* (2006.01)
  *G06F 3/0481* (2013.01)
  *G06F 3/041* (2006.01)
  *G06F 3/0484* (2013.01)
  *G06F 3/0488* (2013.01)
  *G06T 3/20* (2006.01)

(52) U.S. Cl.
  CPC ............... *G09G 5/38* (2013.01); *G06F 3/0412* (2013.01); *G06F 3/0416* (2013.01); *G06F 3/0481* (2013.01); *G06F 3/0488* (2013.01); *G06F 3/04845* (2013.01); *G06T 3/20* (2013.01); *G09G2340/0464* (2013.01); *G09G 2340/14* (2013.01); *G09G 2354/00* (2013.01)

(58) Field of Classification Search
  USPC .......................................................... 345/677
  See application file for complete search history.

(56) References Cited

U.S. PATENT DOCUMENTS

| 8,933,910 | B2 * | 1/2015 | Ikeda | G06F 1/1626 345/174 |
| 2006/0197753 | A1 * | 9/2006 | Hotelling | G06F 1/1626 345/173 |

(Continued)

FOREIGN PATENT DOCUMENTS

| CN | 101303621 A | 11/2008 |
| CN | 102722280 A | 10/2012 |
| CN | 103218117 A | 7/2013 |

*Primary Examiner* — Ryan R Yang
(74) *Attorney, Agent, or Firm* — Ladas & Parry LLP

(57) ABSTRACT

A method and an electronic apparatus for achieving translation of a screen display interface are provided. The method comprises: sensing a first operation action of a user on a sensing screen; generating a first operation instruction when the first operation action is sensed; determining whether the first operation instructions belongs to a translation instruction that is preset for translating the display interface; if determining the first operation instruction belongs to the translation instruction, translating the screen display interface to a preset region by a preset distance towards a direction of an action region according to the first operation instruction for displaying, where the action region is a position region mapping the first operation action to the sensing screen. In this way, the present disclosure can allow a user to operate the full screen of a large sensing screen with a single bond.

5 Claims, 3 Drawing Sheets

(56) References Cited

U.S. PATENT DOCUMENTS

| | | | | |
|---|---|---|---|---|
| 2010/0107116 A1* | 4/2010 | Rieman | ............... | G06F 3/0488 715/784 |
| 2010/0289826 A1* | 11/2010 | Park | ................... | G06F 3/04883 345/676 |
| 2013/0010000 A1* | 1/2013 | Chiu | ..................... | G06F 3/0488 345/676 |
| 2013/0050277 A1* | 2/2013 | Wang | .................. | G06F 3/0486 345/676 |

* cited by examiner

METHOD AND ELECTRONIC APPARATUS FOR ACHIEVING TRANSLATION OF A SCREEN DISPLAY INTERFACE

RELATED APPLICATION

This application is a national phase entry under 35 USC 371 of International Patent Application No PCT/CN2013/080864 filed on 6 Aug. 2013, which was published on 25 Sep. 2014 with International Publication Number WO 2014/146389 A1, which claims priority from Chinese Patent Application No. 201310087300.3 filed on 18 Mar. 2013, the disclosures of which are incorporated in their entirety by reference herein.

FIELD OF THE INVENTION

The present disclosure relates to a method and an electronic apparatus for achieving translation of a screen display interface.

BACKGROUND OF THE INVENTION

With the continuous advancement of science and technologies, electronic apparatuses are equipped with more and more functions to satisfy different users' needs, and the outlines of the electronic apparatuses are designed to be more and more humanized. Currently, in order to facilitate the users' operation, more and more electronic apparatuses are equipped with a sensing screen so that the user can operate such an electronic apparatus directly via the sensing screen without using a physical button.

To further satisfy the users' needs, the sensing screens of the modern electronic apparatuses are developing also towards large screen sizes which can provide the users with better visual and operational experiences. However, for electronic apparatuses equipped with large sensing screens, the users are unable to operate the screen in many cases, and operating such a large sensing screen with a single hand is very difficult if a sensing screen region is relatively distant from the current hand position.

SUMMARY OF THE INVENTION

To solve the aforesaid technical problem, a technical solution adopted in the present disclosure is to provide a method for achieving translation of a screen display interface, which comprises: sensing a first operation action of a user on a sensing screen; generating a first operation instruction when the first operation action is sensed; determining whether the first operation instruction belongs to a translation instruction that is preset for translating the display interface; if it is determined that the operation instruction belongs to the translation instruction, translating the screen display interface to a preset region by a preset distance towards a direction of an action region according to the first operation instruction, displaying the translated screen display interface in the preset region corresponding to a flipped or rotated sensing screen region, wherein the action region is a position region mapping the first operation action to the sensing screen; and sensing a second operation action of the user on the sensing screen in the preset region, and generating a second operation instruction when the second operation action is sensed, and when transmitting the second operation instruction to an application other than a current system drive program, a data coordinate (w, q) in the transmitted second operation instruction satisfy: (w, q)=(t−h, s−v), where (t, s), (h, v) are a coordinate mapping the second operation action to the sensing screen and a coordinate of a center point of the translated screen display interface respectively in a coordinate space that takes a center point of the sensing screen as an origin, and the second operation action is at least one operation action taking place after the first operation action.

To solve the aforesaid technical problem, another technical solution adopted in the present disclosure is to provide a method for achieving translation of a screen display interface, which comprises: sensing a first operation action of a user on a sensing screen; generating a first operation instruction when the first operation action is sensed; determining whether the first operation instruction belongs to a translation instruction that is preset for translating the display interface; and if it is determined that the first operation instruction belongs to the translation instruction, translating the screen display interface to a preset region by a preset distance towards a direction of an action region according to the first operation instruction for displaying, wherein the action region is a position region mapping the first operation action to the sensing screen.

The action region comprises a first region, a second region, a third region and a fourth region having equal regions that are obtained by equally dividing the sensing region into four regions, the first region is an upper left one of the four regions, the second region is an upper right one of the four regions, the third region is a lower left one of the four regions, and the fourth region is a lower right one of the four regions; the step of, if it is determined that the first operation action belongs to the translation instruction, translating the screen display interface to a preset region by a preset distance towards a direction of an action region according to the first operation instruction for displaying, comprises: if the first operation action is an operation action of the user on the first region of the sensing screen, translating the screen display interface upwards by $$a \times \frac{x}{2}$$

and leftwards by $$b \times \frac{y}{2}$$

to the preset region according to the first operation instruction for displaying; if the first operation action is an operation action of the user on the second region of the sensing screen, translating the screen display interface upwards by $$a \times \frac{x}{2}$$

and rightwards by $$b \times \frac{y}{2}$$

to the preset region according to the first operation instruction for displaying; if the first operation action is an operation action of the user on the third region of the sensing screen, translating the screen display interface downwards by $$a \times \frac{x}{2}$$

and leftwards by $$b \times \frac{y}{2}$$

to the preset region according to the first operation instruction for displaying; if the first operation action is an operation action of the user on the fourth region of the sensing screen, translating the screen display interface downwards by $$a \times \frac{x}{2}$$

and rightwards by $$b \times \frac{y}{2}$$

to the preset region according to the first operation instruction for displaying, where, x is a longitudinal length of the sensing screen, y is a lateral width of the sensing screen, $0 \leq a \leq 1$, $0 \leq b \leq 1$, and a and b are not 0 at the same time.

The step of, if it is determined that the first operation instruction belongs to the translation instruction, translating the screen display interface to a preset region by a preset distance towards a direction of an action region according to the first operation instruction for displaying, comprises: if it is determined that the operation instruction belongs to the translation instruction, translating the screen display interface to the preset region by the preset distance towards the direction of the action region according to the first operation instruction; displaying the translated screen display interface in the preset region corresponding to a flipped or rotated sensing screen region.

After the step of, if it is determined that the operation instruction belongs to the translation instruction, translating the content displayed by the screen to a preset region by a preset distance according to the operation instruction for displaying, the method further comprises: sensing a second operation action of the user on the sensing screen in the preset region, and generating a second operation instruction when the second operation action is sensed, and when transmitting the second operation instruction to an application other than a current system drive program, a data coordinate (w, q) in the transmitted second operation instruction satisfy: (w, q)=(t−h, s−v), where (t, s), (h, v) are a coordinate mapping the second operation action to the sensing screen and a coordinate of a center point of the translated screen display interface respectively in a coordinate space that takes a center point of the sensing screen as an origin, and the second operation action is at least one operation action taking place after the first operation action.

After the step of, if it is determined that the first operation instruction belongs to the translation instruction, translating the screen display interface to a preset region by a preset distance towards a direction of an action region according to the first operation instruction for displaying, the method further comprises: automatically recovering the display interface to a status presented by the display interface before it is translated if a recovering instruction that is preset for recovering the display interface is detected; or automatically recovering the display interface to a status presented by the display interface before it is translated if a recovering instruction that is preset for recovering the display interface is detected within a preset time; or automatically recovering the display interface to a status presented by the display interface before it is translated if an idle status has remained for a preset time.

To solve the aforesaid technical problem, yet another technical solution adopted in the present disclosure is to provide an electronic apparatus for achieving translation of a screen display interface, which comprises a sensing module, an instruction generating module, a determining module and a translating module, wherein the sensing module is configured to sense a first operation action of a user on a sensing screen; the instruction generating module is configured to generate a first operation instruction when the first operation action is sensed; the determining module is configured to determine whether the first operation instruction belongs to a translation instruction that is preset for translating the screen interface; the translating module is configured to, if it is determined that the first operation instruction belongs to the translation instruction, translate the screen display interface to a preset region by a preset distance towards a direction of an action region according to the first operation instruction for displaying, wherein the action region is a position region mapping the first operation action to the sensing screen.

The action region comprises a first region, a second region, a third region and a fourth region having equal regions that are obtained by equally dividing the sensing region into four regions, the first region is an upper left one of the four regions, the second region is an upper right one of the four regions, the third region is a lower left one of the four region, and the fourth region is a lower right one of the four regions; the translating module is configured to, if the first operation action is an operation action of the user on the first region of the sensing screen, translate the screen display interface upwards by $$a \times \frac{x}{2}$$

and leftwards by $$b \times \frac{y}{2}$$

to the preset region according to the first operation instruction for displaying; if the first operation action is an operation action of the user on the second region of the sensing screen, translate the screen display interface upwards by $$a \times \frac{x}{2}$$

and rightwards by $$b \times \frac{y}{2}$$

to the preset region according to the first operation instruction for displaying; if the first operation action is an operation action of the user on the third region of the sensing screen, translate the screen display interface downwards by $$a \times \frac{x}{2}$$

and leftwards by $$b \times \frac{y}{2}$$

to the preset region according to the first operation instruction for displaying; if the first operation action is an operation action of the user on the fourth region of the sensing screen, translate the screen display interface downwards by $$a \times \frac{x}{2}$$

and rightwards by $$b \times \frac{y}{2}$$

to the preset region according to the first operation instruction for displaying; where, x is a longitudinal length of the sensing screen, v is a lateral width of the sensing screen, $0 \leq a \leq 1$, $0 \leq b \leq 1$, and a and b are not 0 at the same time.

The step of, if it is determined that the first operation instruction belongs to the translation instruction, translating the screen display interface to a preset region by a preset distance towards a direction of an action region according to the first operation instruction for displaying, comprises: if it is determined that the operation instruction belongs to the translation instruction, translate the screen display interface to the preset region by the preset distance towards the direction of the action region according to the first operation instruction; and display the translated screen display interface in the preset region corresponding to a flipped or rotated sensing screen region.

The sensing module is configured to sense a second operation action of the user on the sensing screen in the preset region; the instruction generating module is configured to generate a second operation instruction when the second operation action is sensed, and when the second operation instruction is transmitted to an application other than a current system drive program, a data coordinate (w, q) in the transmitted second operation instruction satisfy: (w, q)=(t−h, s−v), where (t, s), (h, v) are a coordinate mapping the second operation action to the sensing screen and a coordinate of a center point of the translated screen display interface respectively in a coordinate space that takes a center point of the sensing screen as an origin, and the second operation action is at least one operation action taking place after the first operation action.

The electronic apparatus further comprises a recovering module, which is configured to automatically recover the display interface to a status presented by the display interface before it is translated if a recovering instruction that is preset for recovering the display interface is detected; or automatically recover the display interface to a status presented by the display interface before it is translated if a recovering instruction that is preset for recovering the display interface is detected within a preset time; or automatically recover the display interface to a status presented by the display interface before it is translated if an idle status has remained for a preset time.

The present disclosure has the following benefits: as compared to the prior art, the method for achieving translation of a display interface according to the present disclosure responds to an operation instruction that is obtained through conversion from an operation action of a user on a sensing screen, and translates a screen display interface towards an execution region of the operation action by a preset distance according to the operation instruction so as to display the screen display interface in a preset region. In this way, the screen display interface can be translated as a whole according to the operation position of the user, and the preset distance of the translation can be preset as needed and will not be affected by the operation action. Thereby, the user can control an interface that is relatively distant from the user's hands within a range that can be controlled by a single hand, which allows the user to operate the full screen of a large sensing screen with a single, hand.

DETAILED DESCRIPTION OF THE INVENTION

Currently, screens of electronic apparatuses are all developing towards large screen sizes. However, for electronic apparatuses equipped with large sensing screens, the users are unable to operate the screen with two hands at the same time in many cases, and operating such a large sensing screen with a single hand is very difficult if a sensing screen region is relatively distant from the current hand position.

In view of the aforesaid technical problems, the present disclosure presents a method and an electronic apparatus for achieving translation of a screen display interface, which allow the user to operate the full screen of a large sensing screen with a single hand. The technical solutions of the present disclosure will be further described with reference to the specific embodiments hereinbelow.

Figure 1:
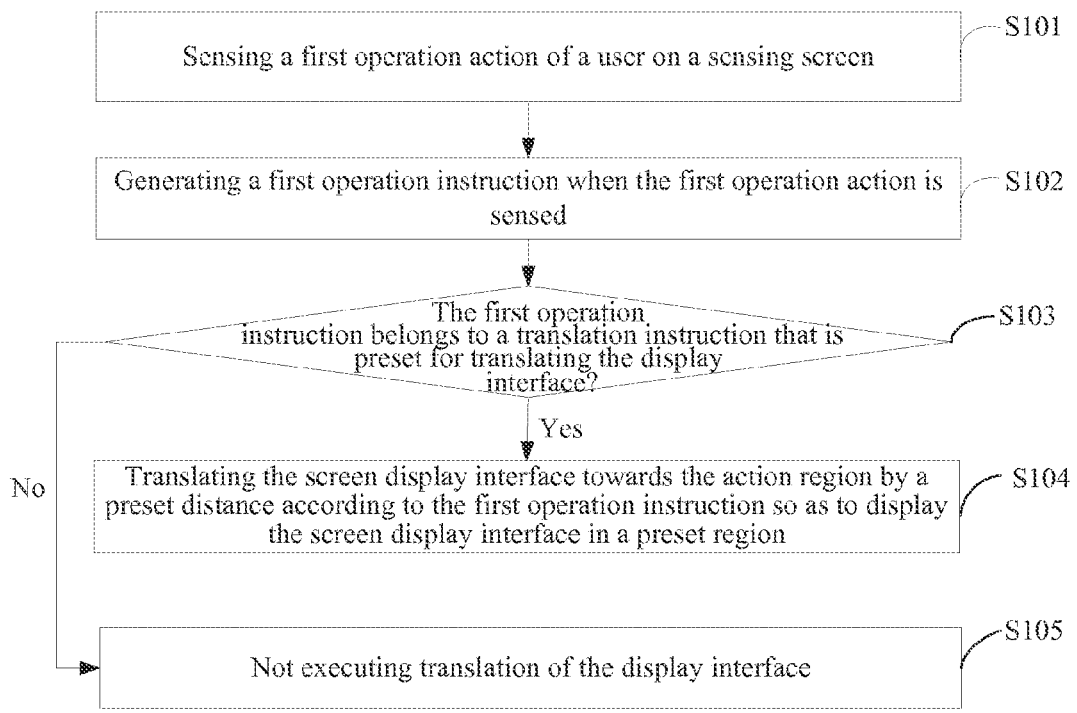
FIG. 1 is a flowchart diagram of an embodiment of a method for achieving translation of a screen display interface according to the present disclosure.

Referring to FIG. 1, an embodiment of a method for achieving translation of a screen display interface according to the present disclosure comprises:

Step S101: sensing a first operation action of a user on a sensing screen.

The apparatus senses the first operation action of the user on the sensing screen. The first operation action may be an operation directly performed on the sensing screen by the user, such as a short-distance slide, a touch, a tap and etc. performed by the user with his or her hands on the sensing screen, and may also be operation actions e.g., a scratching action in the air, a snap and etc.) of the user that are gathered by the apparatus through such technical means as the user somatosensory technology, the posture recognition technology, the voice recognition technology or the like.

Step S102: generating a first operation instruction when the first operation action is sensed.

After having sensed the first operation action, the electronic apparatus generates a first operation instruction that can be identified by the electronic apparatus through internal identification.

Step S103: determining whether the first operation instruction belongs to a translation instruction that is preset for translating the display interface.

In order to facilitate the operations, some translation instructions for translating the display interface may be preset in the electronic apparatus. Then, a corresponding translation action can be executed according to the translation instruction when an operation instruction that is consistent with the preset translation instruction is detected. It is determined whether the first operation instruction belongs to the translation instruction that is preset for translating the display interface; and if the determination result is "yes", step S104 is executed, and if the determination result is "no", step S105 is executed.

Step S104: translating the screen display interface to a preset region by a preset distance towards a direction of an action region according to the first operation instruction for displaying.

The screen display interface is translated to the preset region by the preset distance towards the direction of the action region according to the first operation instruction for displaying. In the embodiment of the present disclosure, the action region is a position region mapping the first operation action to the sensing screen. For an operation action performed by the user directly on the sensing screen, the action region is the region where the coordinate point of the operation action is located; and for an operation action that does not make touch with the sensing screen, the action region is a region where the coordinate point mapping the position of the operation action of the user's hand is located to the sensing screen.

On the other hand, it is worth noting that, in order to achieve accurate translation to satisfy the user's needs, the acting range of the first operation action should be controlled to be within a limited range. In the embodiment of this application, the acting range of the first operation action is preferably controlled to be within a region centering around an initial operation point of the first operation action and having an area of no greater than 10% of the whole screen area so that the translation direction of the screen display interface can be better determined. Of course, another way to achieve this is that, the mobile apparatus may be preset to perform the translation in response to only several preset kinds of operation actions, and makes no response when other actions than the preset operation actions are detected.

Figure 2:
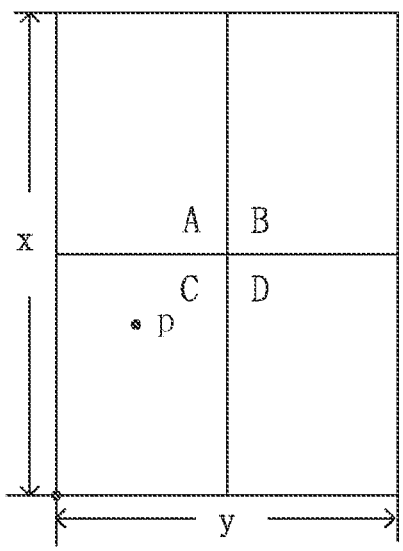
FIG. 2 is a schematic view illustrating an action region in an embodiment of the method for achieving translation of a screen display interface according to the present disclosure.

In a preferred embodiment of the present disclosure, the sensing screen of the electronic apparatus is equally divided into four screens having equal regions, namely, a first region A, a second region B, a third region C and a fourth region D, as shown in FIG. 2. Such region division is the screen layout when the user executes the aforesaid first operation action regardless of whether the screen interface has been flipped or not. In practical operations, the user can, depending on the practical need thereof, operate in a specific region to translate the display interface so that the display interface that is originally relatively distant from the position of the hands thereof can be operated and controlled within the reach of his hands. For example, for a certain user who is used to operating the electronic apparatus with his or her left hand, it may be difficult to reach the first region A, the second region B and even the fourth region D. In this case, the user can execute a corresponding operation action in the third region C so that the display interface moves towards the third region C by a preset distance, and then the user can control and operate the display interface of the other regions, which are difficult to reach, within the reach of his or her hands (i.e., in the third region C). For the user who is used to operating with his or her right hand, the case will be the opposite.

In practical use, for a screen interface defined in the manner as shown in FIG. 2, the mobile apparatus may be preset to translate the display interface in response to only a first operation action that is operated within the range of any one of the four ranges, but not in response to an operation action involving two or more of the four region ranges at the same time. For example, when the user slides from the A region to the B region on the screen with his or her hand, two regions are involved at the same time, so a determination of the direction of the translation can not be accurately made and the mobile apparatus will not translate the screen interface in response to the operation action. Of course, the mobile apparatus may also be preset to translate the screen display interface in a fixed direction as long as the operation instruction that is obtained by converting the first operation action belongs to the translation instruction. For example, for a user who is used to operating with his or her right hand, the mobile apparatus may be preset to translate the screen display interface towards the lower right by a preset distance as long as an instruction that conforms to the translation regulation is received.

In the embodiment of the present disclosure, the translation towards the action region may be a lateral or longitudinal translation towards the action region, or a both lateral and longitudinal translation towards the action region.

In the embodiment of the present disclosure, the distance of the translation of the display interface in response to the first operation instruction may be a preset distance that is set beforehand. That is, no matter how the first operation action executed by the user is, the display interface is controlled to translate towards the action direction by the preset distance as long as the first operation instruction generated belongs to the translation instruction. For the preset distance, the longitudinal moving distance is $$a \times \frac{x}{2},$$

and the lateral moving distance is $$b \times \frac{y}{2},$$

where x is a longitudinal length of the sensing screen, y is a lateral width of the sensing screen, 0≤a≤1, 0≤b≤1, and a and b cannot be 0 at the same time. In the practical use, different translation distances may be set according to the size of the sensing screen. For example, when the lateral width of the sensing screen is relatively small and the longitudinal length thereof is relatively large, b may be preset to be 0 and the translation distance of the display interface is controlled by adjusting a. That is, only a longitudinal translation needs to be executed in response to the operation instruction, and vice versa.

However, for an apparatus equipped with a sensing screen whose lateral width and longitudinal length are both very large, the region may be divided in the manner shown in FIG. 2 and a and b are set to be appropriate values so that the display interface can be translated towards the action region in both the lateral direction and the longitudinal direction in response to the operation instruction. Assume that the position of point P shown in FIG. 2 is the coordinate point mapping the first operation action executed by the user to the sensing screen. Then, in one of the embodiments of the present disclosure, depending on the different positions of the coordinate point, the display interface may be translated according to the following rules:

when P is in the region A, the display interface is translated upwards by $$a \times \frac{x}{2}$$

and leftwards by $$b \times \frac{y}{2};$$

when P is in the region B, the display interface is translated upwards by $$a \times \frac{x}{2}$$

and rightwards by $$b \times \frac{y}{2};$$

when P is in the region C, the display interface is translated downwards by $$a \times \frac{x}{2}$$

and leftwards by $$b \times \frac{y}{2};$$

and when P is in the region D, the display interface is translated downwards by $$a \times \frac{x}{2}$$

and rightwards by $$b \times \frac{y}{2}.$$

The definitions of x, y, a, and b are the same as just as described above.

In the embodiment of the present disclosure, the preset region is the region where the display interface is displayed after being translated towards the action region by a preset distance; and the preset region may be or may not be the same region as the action region.

Figure 3:
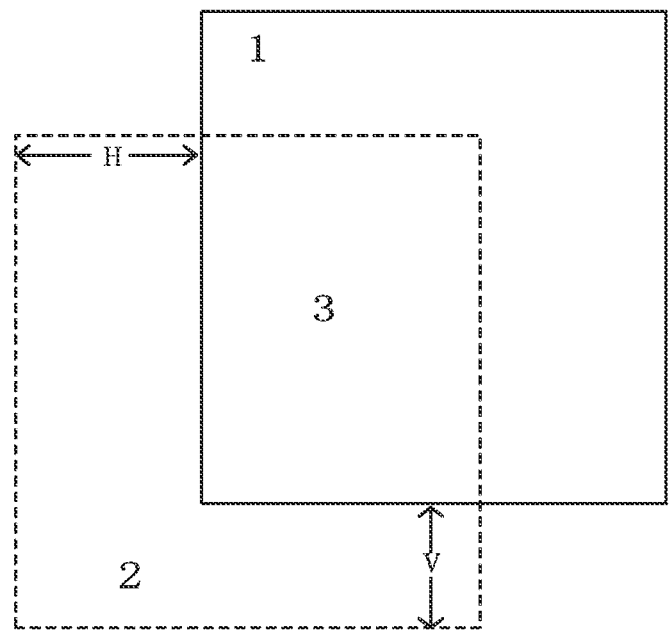
FIG. 3 is a schematic view illustrating display interfaces before and after a translation in an embodiment of the method for achieving translation of a screen display interface according to the present disclosure.

Referring to FIG. 3, there is shown a schematic view illustrating display interfaces before and after the translation. Specifically, the region enclosed by solid lines is defined as a region 1, which is the physical sensing screen region after the translation; the region enclosed by dotted lines is defined as a region 2, which is the original display interface on the sensing screen before the translation; and the overlapped region of the region 1 and the region 2 is defined as a region 3 (i.e., the preset region referred to above), which is a part and the positions of the original display interface that is actually displayed in the physical sensing screen region after the original display interface is translated. In the embodiment of the present disclosure, parts of the screen interface located in the region 2 but outside the region 3 will not be displayed, or the translated screen display interface is displayed in the region 3 corresponding to the flipped or rotated sensing screen region.

Furthermore, in order to further adapt to the translated display interface and accomplish the controlling operation in the translated display interface, the following operations are performed. If, after the translation becomes effective, a second operation action of the user on the sensing screen is sensed and a corresponding second operation instruction is generated, then when the second operation instruction is transmitted to an application other than a current system drive program, a data coordinate (w, q) in the transmitted second operation instruction satisfy: (w, q)=(t−h, s−v). Where (t, s), (h, v) are a coordinate mapping the second operation action to the sensing screen and a coordinate of a center point of the translated screen display interface respectively in a coordinate space that takes a center point of the sensing screen as an origin. The second operation action set forth in the embodiments of the present disclosure is only intended to be distinguished from the first operation action; and the second operation action may be a series of operation actions that take place after the first operation action, or may be an operation action or a series of operation actions.

Figure 4:
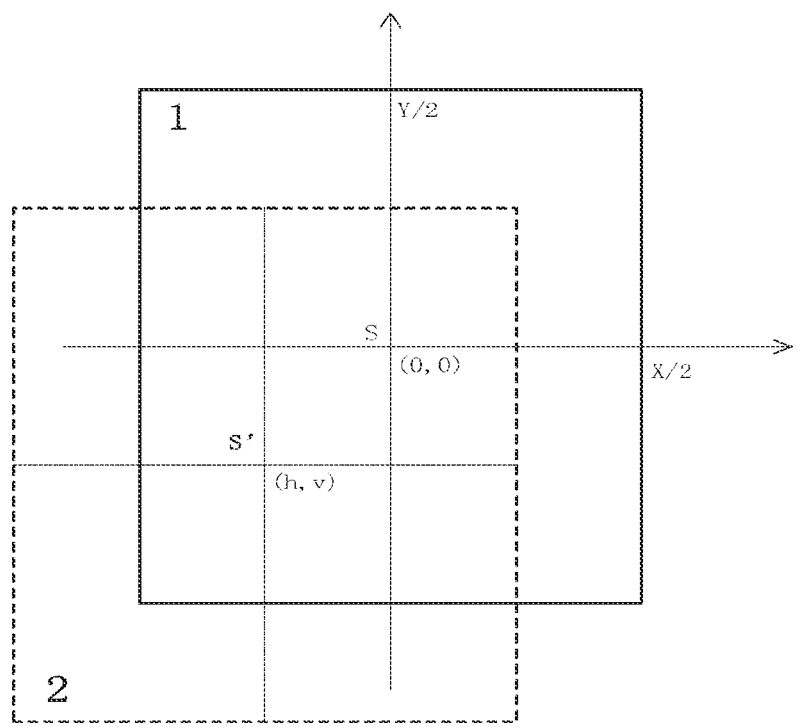
FIG. 4 is a schematic view illustrating position coordinates of center points of display interfaces before and after a translation in an embodiment of the method for achieving translation of a screen display interface according to the present disclosure.

FIG. 4 is a schematic view illustrating position coordinates of center points of display interfaces before and after the translation. Specifically, S is the center point of the sensing screen, S' is the original center point of the translated display interface, and the coordinates of S' in the coordinate space that takes S as an origin as shown is (h, v).

That is, after the translation becomes effective, all second operation actions that newly take place on the sensing screen are sensed and a corresponding second operation instruction is generated. When the second operation instruction is transmitted to an upper-layer application or a display component, which has any element displayed previously, in the upper layer of the system other than the current electronic apparatus drive program or to an active display control of the operation system, the data coordinates carried in the second operation instruction transmitted need to be adjusted correspondingly so that the controlling operation can be accurately accomplished in the translated display interface. As shown in FIG. 4, in this embodiment, the interface element originally displayed at a point S will be moved to and displayed at a point S' after the display interface is translated. If the user clicks the point S' at this moment (the clicking event is just the second operation action described above), then according to the rule of converting the coordinate data of the second operation instruction described above, the position at which the clicking event takes place that is obtained by an upper-layer program currently operating after the position data information of the clicking event taking place at the point S' is transmitted to the upper-layer program will be the coordinates of the point S. Thereby, the upper-layer program currently operating can normally execute corresponding operation actions in the logical space of the original interface.

Furthermore, in order to further satisfy the user's needs, a time duration in which the translation is effective may be preset. For example, a time or a recovering instruction may be preset, or the display interface may be set to be recovered to a status presented by the display interface before it is translated when a preset recovering instruction is received at a preset time. That is, the display interface is automatically recovered to a status presented by the display interface before it is translated if a recovering instruction that is preset for recovering the display interface is detected; or the display interface is automatically recovered to a status presented by the display interface before it is translated if a recovering instruction that is preset for recovering the display interface is detected within a preset time; or the display interface is automatically recovered to a status presented by the display interface before it is translated if an idle status has remained for a preset time.

For example, a fixed time duration t is defined. The aforesaid preset time for which an idle status has remained begins after the aforesaid first operation action is detected and the translation of the display interface is accomplished according to the first operation instruction. When an action input of any form of the user (i.e., any of the operation actions of the second operation action described above) is detected again, a timer is reset to time from the beginning; and the display interface is automatically recovered to a status presented by the display interface before it is translated if an idle status has remained (i.e., no action input of the user is detected) for the time duration t. Or, a recovering instruction may be defined. The display interface is automatically recovered to a status presented by the display interface before it is translated as long as the operation instruction generated by the operation action of the user belongs to the recovering instruction. The recovering instruction may be a touch gesture operation of the user or a gesture operation of other forms, or an operation instruction that is obtained by converting input events of one or more physical buttons. Or, the display interface is automatically recovered to a status presented by the display interface before it is translated only when the recovering instruction is received within the fixed time duration t. The present disclosure will not limit the specific implementations of the recovering, and the user may set the manner of recovering by himself or herself as needed.

Step S105: ending.

The translation of the display interface is not executed if the first operation instruction does not belong to the translation instruction that is preset for translating the display interface.

From the above description of the embodiments, it can be understood that, the method for achieving translation of a display interface according to the present disclosure responds to an operation instruction that is obtained through conversion from an operation action of a user on a sensing screen, and translates a screen display interface towards an execution region of the operation action by a preset distance according to the operation instruction so as to display the screen display interface in a preset region. In this way, the screen display interface can be translated as a whole according to the operation position of the user, and the preset distance of the translation can be preset as needed and will not be affected by the operation action. Thereby, the user can control an interface that is relatively distant from the user's hands within a range that can be controlled by a single hand, which allows the user to operate the full screen of a large sensing screen with a single hand.

Figure 5:
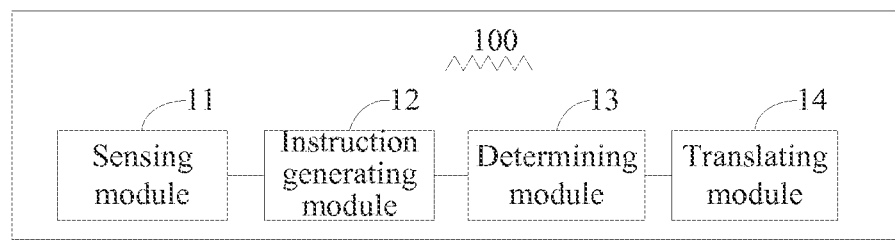
FIG. 5 is a schematic structural view of an embodiment of an electronic apparatus for achieving translation of a screen display interface according to the present disclosure.

Referring to FIG. 5, there is shown a schematic structural view of an embodiment of an electronic apparatus for translating a display interface according to the present disclosure. An electronic apparatus 100 for achieving translation of a display interface comprises a sensing module 11, an instruction generating module 12, a determining module 13 and a translating module 14.

The sensing module 11 is configured to sense a first operation action of a user on a sensing screen.

The sensing module 11 senses the first operation action of the user on the sensing screen. The first operation action may be an operation performed by the user directly on the sensing screen, such as a short-distance slide, a touch, a tap and etc. performed by the user with his or her hand on the sensing screen, and may also be an operation action (e.g., a scratching action in the air, a snap and etc.) of the user that are gathered by the apparatus through such technical means as the user somatosensory technology, the posture recognition technology, the voice recognition technology or the like.

The instruction generating module 12 is configured to generate first operation instruction when the first operation action is sensed.

After having sensed the first operation action, the sensing module 11 transmits the first operation action to the instruction generating module 12, which then generates the first operation instruction that can be identified by the electronic apparatus through internal identification.

The determining module 13 is configured to determine whether the first operation instruction belongs to a translation instruction that is preset for translating the display interface.

In order to facilitate the operations, some translation instructions for translating the display interface may be preset in the electronic apparatus so that, when an operation instruction consistent with a preset translation instruction is detected, a corresponding translation action can be executed according to the translation instruction. The determining module 13 determines whether the first operation instruction belongs to the translation instruction that is preset for translating the display interface, and then outputs the determination result to the translating module 14.

The translating module 14 is configured to, if it is determined that the first operation instruction belongs to the translation instruction, translate the screen display interface to a preset region by a preset distance towards the direction of the action region according to the first operation instruction for displaying, where the action region is a position region mapping the first operation action to the sensing screen.

The translating module 14 translates the screen display interface to the preset region by the preset distance towards the direction of the action region according to the first operation instruction for displaying the screen display interface in the preset region. In the embodiment of the present disclosure, the action region is a position region mapping the first operation action to the sensing screen. For an operation action performed by the user directly on the sensing screen, the action region is the region where the coordinate point of the operation action is located; and for an operation action that does not make touch with the sensing screen, the action region is the region where the coordinate point mapping the position of the operation action performed by the user's hand is located to the sensing screen.

On the other hand, it is worth noting that, in order to achieve accurate translation to satisfy the user's needs, the acting range of the first operation action should be controlled to be within a limited range, in the embodiment of this application, the acting range of the first operation action is preferably controlled to be within a region centering around an initial operation point of the first operation action and having an area of no greater than 10% of the whole screen area so that the translation direction of the screen display interface can be better determined. Of course, another way to achieve this is that, the mobile apparatus may be preset to perform the translation in response to only several preset kinds of operation actions, and makes no response when other actions than the preset operation actions are detected.

In an embodiment of the present disclosure, the action region comprises a first region, a second region, a third region and a fourth region having equal regions that are obtained by equally dividing the sensing screen into the four regions. Specifically, the first region is an upper left one of the four regions, the second region is an upper right one of the four regions, the third region is a lower left one of the four regions, and the fourth region is a lower right one of the four regions.

The translating module 14 is configured to: when it is determined that the first operation instruction belongs to the translation instruction, translate the screen display interface upwards by $$a \times \frac{x}{2}$$

and leftwards by $$b \times \frac{y}{2}$$

to the preset region according to the first operation instruction so as to be displayed in the preset region if the first operation action is an operation action of the user on the first region of the sensing screen; translate the screen display interface upwards by $$a \times \frac{x}{2}$$

and rightwards by $$b \times \frac{y}{2}$$

to the preset region according to the first operation instruction so as to be displayed in the preset region if the first operation action is an operation action of the user on the second region of the sensing screen; translate the screen display interface downwards by $$a \times \frac{x}{2}$$

and leftwards by $$b \times \frac{y}{2}$$

to the preset region according to the first operation instruction so as to be displayed in the preset region if the first operation action is an operation action of the user on the third region of the sensing screen; translate the screen display interface downwards by $$a \times \frac{x}{2}$$

and rightwards by $$b \times \frac{y}{2}$$

to the preset region according to the first operation instruction so as to be displayed in the preset region if the first operation action is an operation action of the user on the fourth region of the sensing screen, where x is a longitudinal length of the sensing screen, y is a lateral width of the sensing screen, $0 \leq a \leq 1$, $0 \leq b \leq 1$, and a and b cannot be 0 at the same time.

In the embodiment of the present disclosure, the translation towards the action region may be a lateral or longitudinal translation towards the action region, or a both lateral and longitudinal translation towards the action region.

In the embodiment of the present disclosure, the distance of the translation of the display interface in response to the first operation instruction may be a preset distance that is set beforehand. That is, no matter how the first operation action executed by the user is, the display interface is controlled to translate towards the action direction by the preset distance as long as the first operation instruction generated belongs to the translation instruction. In the practical use, different translation distances may be set according to the size of the sensing screen. For example, when the lateral width of the sensing screen is relatively small and the longitudinal length thereof is relatively large, b may be preset to be 0 and the translation distance of the display interface is controlled by adjusting a. That is, only a longitudinal translation needs to be executed in response to the operation instruction, and vice versa.

The translating module 14 is configured to, if it is determined that the operation instruction belongs to the translation instruction, translate the screen display interface to a preset region by a preset distance towards a direction of an action region according to the first operation instruction, and display the translated screen display interface in the preset region corresponding to the flipped or rotated sensing screen region.

The sensing module 11 is further configured to sense a second operation action of the user on the sensing screen in the preset region.

The instruction generating module 12 is configured to generate a second operation instruction when the second operation action is sensed, and when the second operation instruction is transmitted to an application other than a current system drive program, a data coordinate (w, q) in the transmitted second operation instruction satisfy: $(w, q)=(t-h, s-v)$, where $(t, s)$, $(h, v)$ are a coordinate mapping the second operation action to the sensing screen and a coordinate of a center point of the translated screen display interface respectively in a coordinate space that takes a center point of the sensing screen as an origin, and the second operation action is at least one operation action taking place after the first operation action.

Figure 6:
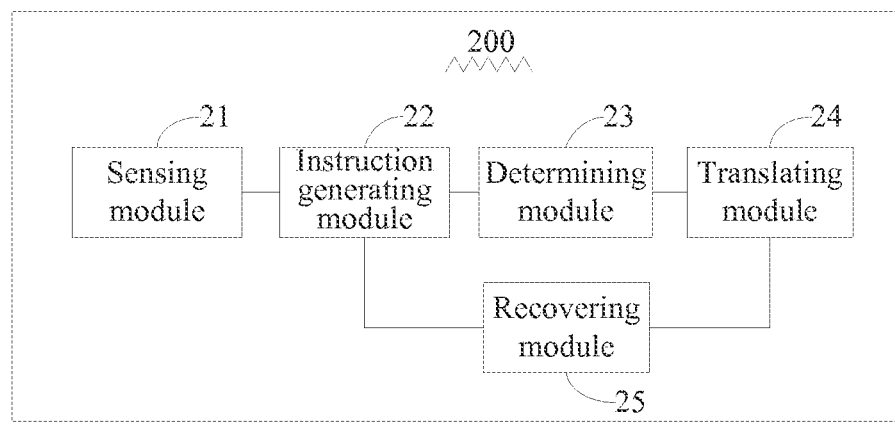
FIG. 6 is a schematic structural view of another embodiment of the electronic apparatus for achieving translation of a screen display interface according to the present disclosure.

Referring to FIG. 6, there is shown a schematic structural view of another embodiment of the electronic apparatus for achieving translation of a screen display interface according to the present disclosure. An electronic apparatus 200 for achieving translation of a screen display interface comprises a sensing module 21, an instruction generating module 22, a determining module 23, a translation module 24 and a recovering module 25.

The sensing module 21 is configured to sense a first operation action of a user on a sensing screen.

The instruction generating module 22 is configured to generate a first operation instruction when the first operation action is sensed.

The determining module 23 is configured to determine whether the first operation instruction belongs to a translation instruction that is preset for translating the display interface.

The translating module 24 is configured to, if it is determined that the first operation instruction belongs to the translation instruction, translate the screen display interface to a preset region by a preset distance towards the direction of action region according to the first operation instruction for displaying, where the action region is a position region mapping the first operation action to the sensing screen.

The recovering module 25 is configured to automatically recover the display interface to a status presented by the display interface before it is translated if a recovering instruction that is preset for recovering the display interface is detected; or automatically recover the display interface to a status presented by the display interface before it is translated if a recovering instruction that is preset for recovering the display interface is detected within a preset time; or automatically recover the display interface to a status presented by the display interface before it is translated if an idle status has remained for a preset time.

In order to further satisfy the user's needs, a time duration in which the translation is effective may be preset. For example, a time or a recovering instruction may be preset, or the display interface may be set to be recovered to a status presented by the display interface before it is translated when a preset recovering instruction is received at a preset time. That is, the recovering module 25 automatically recovers the display interface to a status presented by the display interface before it is translated if a recovering instruction that is preset for recovering the display interface is detected; or the recovering module 25 automatically recovers the display interface to a status presented by the display interface before it is translated if a recovering instruction that is preset for recovering the display interface is detected within a preset time; or the recovering module 25 automatically recovers the display interface to a status presented by the display interface before it is translated if an idle status has remained for a preset time.

For example, a fixed time duration t is defined. The aforesaid preset time for which an idle status has remained begins after the aforesaid first operation action is detected and the translation of the display interface is accomplished according to the first operation instruction. When an action input of any form of the user (i.e., any of the operation actions of the second operation action described above) is detected again, a timer is reset to time from the beginning; and the display interface is automatically recovered to a status presented by the display interface before it is translated if an idle status has remained (i.e., no action input of the user is detected) for the time duration t. Or, a recovering instruction may be defined. The display interface is automatically recovered to a status presented by the display interface before it is translated as tong as the operation instruction generated by the operation action of the user belongs to the recovering instruction. The recovering instruction may be a touch gesture operation of the user or a gesture operation of other forms, or an operation instruction that is obtained by converting input events of one or more physical buttons. Or, the display interface is automatically recovered to a status presented by the display interface before it is translated only when the recovering instruction is received within the fixed time duration t. The present disclosure will not limit the specific implementations of the recovering, and the user may set the manner of recovering by himself or herself as needed.

From the above description of the embodiments, it can be understood that, the method for achieving translation of a display interface according to the present disclosure responds to an operation instruction that is obtained through conversion from an operation action of a user on a sensing screen, and translates a screen display interface towards an execution region of the operation action by a preset distance according to the operation instruction so as to display the screen display interface in a preset region. In this way, the screen display interface can be translated as a whole according to the operation position of the user, and the preset distance of the translation can be preset as needed and will not be affected by the operation action. Thereby, the user can control an interface that is relatively distant from the user's hands within a range that can be controlled by a single hand, which allows the user to operate the full screen of a large sensing screen with a single hand.

What described above are only embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the protection scope of the present disclosure.

Furthermore, it is apparent to those skilled in the art, the present disclosure also provides a wireless communication apparatus, which comprises a non-transitory program storage medium and a processor. The non-transitory program storage medium stores a program executed by the processor to perform the method as described in above. Furthermore, it is apparent to those skilled in the art that, various modules 11, 12, 13, 14, 21, 22, 23, 24, 25 as shown in FIGS. 5-6 are software modules or software units. In another aspect, it is well-known that various software modules or software units inherently are stored in the non-transitory program storage medium and executed by the processor.

What is claimed is:

1. A method for achieving translation of a screen display interface, comprising:
   sensing a first operation action of a user on a sensing screen;
   generating a first operation instruction when the first operation action is sensed;
   determining whether the first operation instruction belongs to a translation instruction that is preset for translating the display interface;
   if it is determined that the operation instruction belongs to the translation instruction, translating the screen display interface to a preset region by a preset distance towards a direction of an action region according to the first operation instruction, displaying the translated screen display interface in the preset region corresponding to a flipped or rotated sensing screen region, wherein the action region is a position region mapping the first operation action to the sensing screen; and
   sensing a second operation action of the user on the sensing screen in the preset region, and generating a second operation instruction when the second operation action is sensed, and when transmitting the second operation instruction to an application other than a current system drive program, a data coordinate (w, q) in the transmitted second operation instruction satisfy: (w, q)=(t−h, s−v), where (t, s), (h, v) are a coordinate mapping the second operation action to the sensing screen and a coordinate of a center point of the translated screen display interface respectively in a coordinate space that takes a center point of the sensing screen as an origin, and the second operation action is at least one operation action taking place after the first operation action.

2. A method for achieving translation of a screen display interface, comprising:
   sensing a first operation action of a user on a sensing screen;
   generating a first operation instruction when the first operation action is sensed;
   determining whether the first operation instruction belongs to a translation instruction that is preset for translating the display interface; and
   if it is determined that the first operation instruction belongs to the translation instruction, translating the screen display interface to a preset region by a preset distance towards a direction of an action region according to the first operation instruction for displaying, wherein the action region is a position region mapping the first operation action to the sensing screen;
   wherein the action region comprises a first region, a second region, a third region and a fourth region having equal regions that are obtained by equally dividing the sensing screen into four regions, the first region is an upper left one of the four regions, the second region is an upper right one of the four regions, the third region is a lower left one of the four regions, and the fourth region is a lower right one of the four regions;
   the step of, if it is determined that the first operation action belongs to the translation instruction, translating the screen display interface to a preset region by a preset distance towards a direction of an action region according to the first operation instruction for displaying, comprises:
   if the first operation action is an operation action of the user on the first region of the sensing screen, translating the screen display interface upwards by $$a \times \frac{x}{2}$$

and leftwards by $$b \times \frac{y}{2}$$

to the preset region according to the first operation instruction for displaying;
   if the first operation action is an operation action of the user on the second region of the sensing screen, translating the screen display interface upwards by $$a \times \frac{x}{2}$$

and rightwards by $$b \times \frac{y}{2}$$

to the preset region according to the first operation instruction for displaying;
   if the first operation action is an operation action of the user on the third region of the sensing screen, translating the screen display interface downwards by $$a \times \frac{x}{2}$$

and leftwards by $$b \times \frac{y}{2}$$

to the preset region according to the first operation instruction for displaying;
   if the first operation action is an operation action of the user on the fourth region of the sensing screen, translating the screen display interface downwards by $$a \times \frac{x}{2}$$

and rightwards by $$b \times \frac{y}{2}$$

to the preset region according to the first operation instruction for displaying;

where, x is a longitudinal length of the sensing screen, y is a lateral width of the sensing screen, $0 \leq a \leq 1$, $0 \leq b \leq 1$, and a and b are not 0 at the same time.

3. The method of claim 2, wherein:

the step of, if it is determined that the first operation instruction belongs to the translation instruction, translating the screen display interface to a preset region by a preset distance towards a direction of an action region according to the first operation instruction for displaying, comprises:

if it is determined that the operation instruction belongs to the translation instruction, translating the screen display interface to the preset region by the preset distance towards the direction of the action region according to the first operation instruction, and displaying the translated screen display interface in the preset region corresponding to a flipped or rotated sensing screen region.

4. The method of claim 2, wherein after the step of, if it is determined that the operation instruction belongs to the translation instruction, translating the screen display interface to a preset region by a preset distance towards a direction of an action region according to the first operation instruction for displaying, the method further comprises:

sensing a second operation action of the user on the sensing screen in the preset region, and generating a second operation instruction when the second operation action is sensed, and when transmitting the second operation instruction to an application other than a current system drive program, a data coordinate (w, q) in the transmitted second operation instruction satisfy: $(w, q) = (t-h, s-v)$, where (t, s), (h, v) are a coordinate mapping the second operation action to the sensing screen and a coordinate of a center point of the translated screen display interface respectively in a coordinate space that takes a center point of the sensing screen as an origin, and the second operation action is at least one operation action taking place after the first operation action.

5. The method of claim 4, wherein after the step of, if it is determined that the first operation instruction belongs to the translation instruction, translating the screen display interface to a preset region by a preset distance towards a direction of an action region according to the first operation instruction for displaying, the method further comprises:

automatically recovering the display interface to a status presented by the display interface before it is translated if a recovering instruction that is preset for recovering the display interface is detected; or automatically recovering the display interface to a status presented by the display interface before it is translated if a recovering instruction that is preset for recovering the display interface is detected within a preset time; or automatically recovering the display interface to a status presented by the display interface before it is translated if an idle status has remained for a preset time.

* * * * *